(12) United States Patent
Müller

(10) Patent No.: US 6,508,321 B1
(45) Date of Patent: Jan. 21, 2003

(54) DIESEL-ELECTRIC DRIVE SYSTEM WITH A STARTING TORQUE CONVERTER

(75) Inventor: Robert Müller, Dillingen (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/462,344

(22) PCT Filed: Jun. 23, 1998

(86) PCT No.: PCT/EP98/03821

§ 371 (c)(1),
(2), (4) Date: May 19, 2000

(87) PCT Pub. No.: WO99/02359

PCT Pub. Date: Jan. 21, 1999

(30) Foreign Application Priority Data

Jul. 10, 1997 (DE) .......................................... 197 29 382

(51) Int. Cl.⁷ ................................................ B60K 1/00
(52) U.S. Cl. ..................... 180/65.3; 180/65.2; 180/65.6
(58) Field of Search ............... 180/65.1, 65.2, 180/65.3, 65.6, 65.7

(56) References Cited

U.S. PATENT DOCUMENTS

| | | | | |
|---|---|---|---|---|
| 3,915,251 A | | 10/1975 | Kassekert et al. | |
| 4,108,290 A | * | 8/1978 | Fisher | 192/3.3 |
| 4,306,156 A | | 12/1981 | Monaco et al. | |
| 5,318,142 A | * | 6/1994 | Bates et al. | 180/65.2 |
| 5,323,868 A | * | 6/1994 | Kawashima | 180/65.4 |
| 5,550,445 A | * | 8/1996 | Nii | 318/153 |
| 5,713,426 A | * | 2/1998 | Okamura | 180/65.3 |
| 5,778,997 A | * | 7/1998 | Setaka et al. | 180/65.2 |
| 5,786,640 A | * | 7/1998 | Sakai et al. | 290/17 |
| 5,823,280 A | * | 10/1998 | Lateur et al. | 180/65.2 |
| 5,969,624 A | * | 10/1999 | Sakai et al. | 340/636 |
| 6,098,733 A | * | 8/2000 | Ibaraki et al. | 180/65.2 |

FOREIGN PATENT DOCUMENTS

| | | | | |
|---|---|---|---|---|
| DE | 43 39 703 A1 | 5/1995 | ............ | B60K/6/00 |
| EP | 0 527 145 B1 | 7/1996 | ............ | B60L/11/08 |
| JP | 08168104 | 6/1996 | ............ | B60L/11/14 |

OTHER PUBLICATIONS

"Drive Systems With Permanent Magnet Synchronous Motors", *Automotive Engineering*, Feb. 1995, pp. 75, 77, 79, 81.

"Ein Elektrischer Einzelradantrieb Für City Busse Der Zukunft"—VOITH (7 pages).

* cited by examiner

*Primary Examiner*—Robert P. Olszewski
*Assistant Examiner*—James S. McClellan
(74) *Attorney, Agent, or Firm*—Randall J. Knuth

(57) ABSTRACT

A drive system for a vehicle, especially a non-guided vehicle, comprising at least one internal combustion engine, at least one generator, at least one electric drive motor and at least one torque converter, the torque converter being positioned between the drive motor and an output shaft leading to the vehicle axes. The drive system is characterized in that the drive motor is coupled with the converter in order to increase the torque conveyed to the vehicle axes by the drive motor via the output shaft at particular speeds or accelerations.

7 Claims, 2 Drawing Sheets

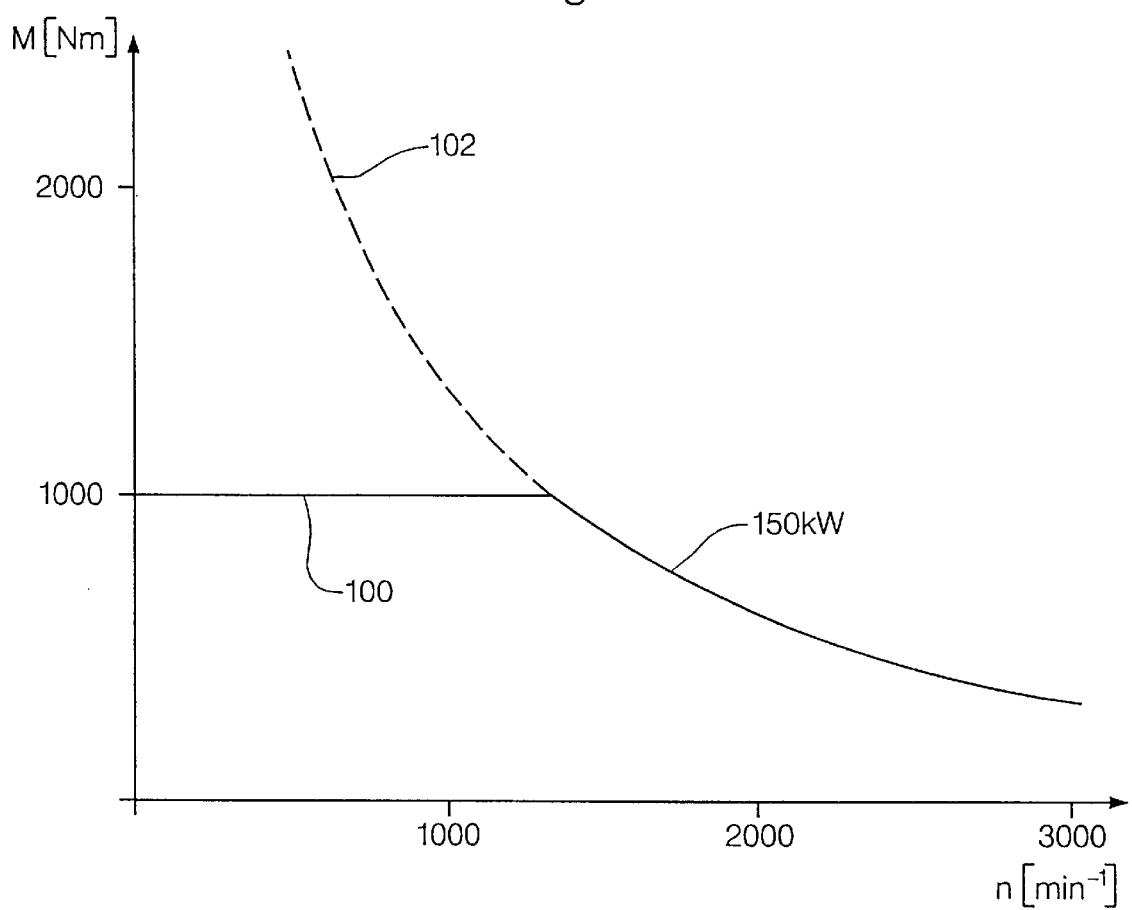

DIESEL-ELECTRIC DRIVE SYSTEM WITH A STARTING TORQUE CONVERTER

BACKGROUND OF THE INVENTION

1. Field of the Invention

The present invention relates to invention is relative to a drive arrangement for a vehicle, especially a non-railborne vehicle, with at least one internal combustion engine, at least one generator, at least one electric drive motor and at least one torque converter arranged between the drive motor and a driven shaft as well as to a method for increasing the torque transferred onto the vehicle axles of a non-railborne vehicle with diesel-electric drive.

2. Description of the Related Art

The use of drives in which an internal combustion engine is connected to a generator for the production of current and in which the drive is brought about by an electromotor fed by said generator is currently being increasingly discussed, especially for street vehicles. Particular attention is to be called here to the so-called diesel-electric drives.

Such a diesel-electric drive is known for a non-railborne vehicle, for example, from European patent EP 0,527,145 B1. The vehicle known from this publication is distinguished in that the internal combustion engine and the generator are combined to a so-called internal combustion engine-generator subassembly.

Special drive concepts for vehicles with an internal combustion engine and a generator in which so-called permanent-magnet motors are used as drive motors are known from "Drive Systems with Permanent Magnet Synchronous Motors" in Automotive Engineering, February, 1995, pp. 75–81.

The use of diesel-electric drives, especially in commercial vehicles, is described in the publication, "An Electrical Individual-Wheel Drive for City Busses of the Future", B. Wüst, R. Müller, A. Lange in Local Service, June/1994, Alba Fachverlag, Dusseldorf, pp. 1–7. The disclosed content of all previously cited publications is included herewith to its complete extent in the present application.

The drive motors and traction motors were always arranged close to the wheels in the drive arrangements known from the state of the art, especially in the form of the last-cited publication. This entailed a great number of disadvantages. For example, such drive arrangements were quite heavy and the vehicles deviated significantly in their design from traditional vehicles with conventional drive so that there was no compatibility.

SUMMARY OF THE INVENTION

These disadvantages can be overcome by a central drive in which the traction motors are not mounted on the axle close to the wheels or in the same axle, but rather are coupled to the axis via a summation transmission. In such an arrangement the traction motor can be attached in the chassis of, e.g., a city bus and drive a customary mechanical low-platform axle by means of a universal-joint shaft. This can reduce to a minimum the construction differences of a vehicle with a diesel-electric drive in comparison to a vehicle with an automatic transmission, which brings about significant logistic advantages.

A further disadvantage of the previous drive concepts was the fact that more than one traction motor always had to be used, e.g., two traction motors attached close to the wheels using the concept known from B. Wüst, R. Müller, A. Lange: An Electrical Individual-Wheel Drive for City Busses of the Future, Der Nahverkehr, June/1994, pp. 1–7, Aba Fachverlag Dusseldorf. This was disadvantageous in particular in the case of permanently excited traction motors, which also include the transversal flux machines used as a motor. When two traction motors were used, very great no-load losses had to be overcome, which appear on account of the permanent excitation of the traction motors. A minimizing of the no-load losses might be possible if only one central traction motor is provided instead of, e.g., two traction motors.

The problem of the central drive concepts addressed is the fact that when only a single, central traction or drive motor is used during starting, only an insufficient torque is made available on the axles from the traction motor.

This problem is solved in accordance with the invention in that the drive motor or traction motor is coupled to a torque converter for magnifying the torque delivered from the drive motor onto the vehicle axles.

The torque output from the drive motor can be converted and magnified by connecting in a torque converter between the drive motor and the driven shaft. This is especially necessary during the starting of the vehicle in order to make available the required torques and starting traction. The same applies to use on inclines.

It is especially advantageous if the drive motor is not constantly connected to the converter but rather can be coupled to the converter and decoupled from it as required with the aid of a coupling. Any type of coupling is suitable for this purpose, e.g., those shown in Dubbel, "Pocket Book for Machine Construction", $18^{th}$ edition, pages G63–G74. The disclosed content of the previously cited publication is included to its full extent in this application. Converter bridge couplings and so-called lock-up couplings, which couple the converter to the traction motor as required and, when a torque conversion is no longer required, bridge the torque converter. Such converter bridge couplings or lock-up couplings are known in particular for hydrodynamic torque converters and shown, e.g., in Gerigk, Bruhn, Danner, Endruschat, Gobert, Gross, Komoll, Motor Vehicle Technology, Westermann Verlag, $2^{nd}$ edition, 1994, pp. 349–352, the disclosed content of which is completely included in this application. In a hydrodynamic torque converter with bridge coupling or lock-up coupling, the converter operates with open coupling, that is, the converter is connected into the power flow from the drive motor to the driven shaft, whereas, on the other hand, when the coupling is closed the converter is bridged, so that the drive motor acts directly on the driven shaft.

A special embodiment provides that the drive arrangement comprises a control with whose aid it is possible that the converter is coupled to the drive motor when starting procedures are detected and when a set travel speed and/or starting acceleration is exceeded the control bridges the torque converter and separates it from the drive motor so that the drive motor then acts directly on the driven shaft and drives the vehicle. Thus, the torque converter operates only in the lower speed range and compensates, by means of the achievable magnifying of the torque, the disadvantage of the too slight torque of the electrical drive machine in this operating state. As a result of the monitoring of the starting acceleration by means of the control of the invention, the converter is only utilized for a rather long time period in very few instances of starting procedures. A torque conversion for a rather long time period is required in particular when starting on inclines, e.g., on inclines greater than 6 percent, with a fully occupied vehicle. In all other starting instances, the lock-up coupling is already closed in a short time so that losses, which can occur as a consequence of the converter output, remain without noticeable effects on the fuel consumption of the vehicle equipped with a torque converter. I this manner, it is achieved that the consumption advantage which can be achieved with a diesel-electric vehicle is preserved.

A hydrodynamic torque converter like the one disclosed, e.g., in "Hydrodynamic Transmissions, Couplings and Brakes", Krausskopf-Verlag GmbH, Mainz, 1970 on pages 28–37 is used with preference as a torque converter. A hydrodynamic torque converter comprises, in addition to a pump impeller and a turbine wheel, a guide wheel, which is also designated as a reaction component. Since the guide wheel of a torque converter must receive a moment as a reaction component and since the sum of the moments in the circuit must be equal to zero, the turbine moment can be greater than, equal to or less than the pump moment, depending on the magnitude and direction of rotation of the guide-wheel moment, that is, the pump moment can therefore be converted.

A drive arrangement in which the drive motor is arranged in the vehicle chassis is especially preferred. It is advantageous if a so-called central motor arrangement is selected for such an arrangement. Moreover an advantageous embodiment can provide that the generator and the drive motor are combined to an electrical transmission unit. This establishes the greatest possible compatibility with traditional drives. The drive train corresponds in its design to that of a conventional vehicle and the electrical transmission unit composed of generator and drive motor can take the place of the conventional transmission.

The use of so-called transversal flux machines as electrical drive motors is especially preferred. Such transversal flux machines are described, e.g., in the publication "An Electrical Individual-Wheel Drive for City Busses of the Future", B. Wüst, R. Müller, A. Lange in Local Service, June/1994, Alba Fachverlag, Dusseldorf, pp. 1–7. The content of this article is included herewith to its complete extent in the disclosed content of the present application.

In addition to the drive arrangement, the invention also makes available a method of increasing the torque transferred onto the vehicle axles of a non-railborne vehicle with diesel-electric drive. According to the method of the invention a start process of the non-railborne vehicle is detected. If such a start process is signaled to the control, the latter brings about the connecting of a torque converter to the drive motor. As a result of the coupling in of the torque converter into the drive train between the drive motor and the driven shaft, the torque made available from the drive motor is converted into a higher starting moment. For example, as a result of such a conversion of moment the torque on the driven shaft can be twice as great as the input moment made available from the drive motor. The travel speed and the vehicle acceleration are determined with the aid of sensors. If a given value for the travel speed or the starting acceleration is achieved, a signal is transmitted in turn to the control unit. This signal causes the control unit to decouple the torque converter from the drive motor or to bridge it so that the drive motor acts directly on the driven shaft. The time in which the conversion of moment is active during the starting process is set by the appropriate selection of the previously determined vehicle speed value or vehicle acceleration value. These parameters can be very readily optimized by an expert in the art without inventive activity as regards the starting moments required for different incline stretches and as regards the fuel consumption.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 shows a schematic course of the torque-speed course of the drive machine as traction motor with and without torque converter.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
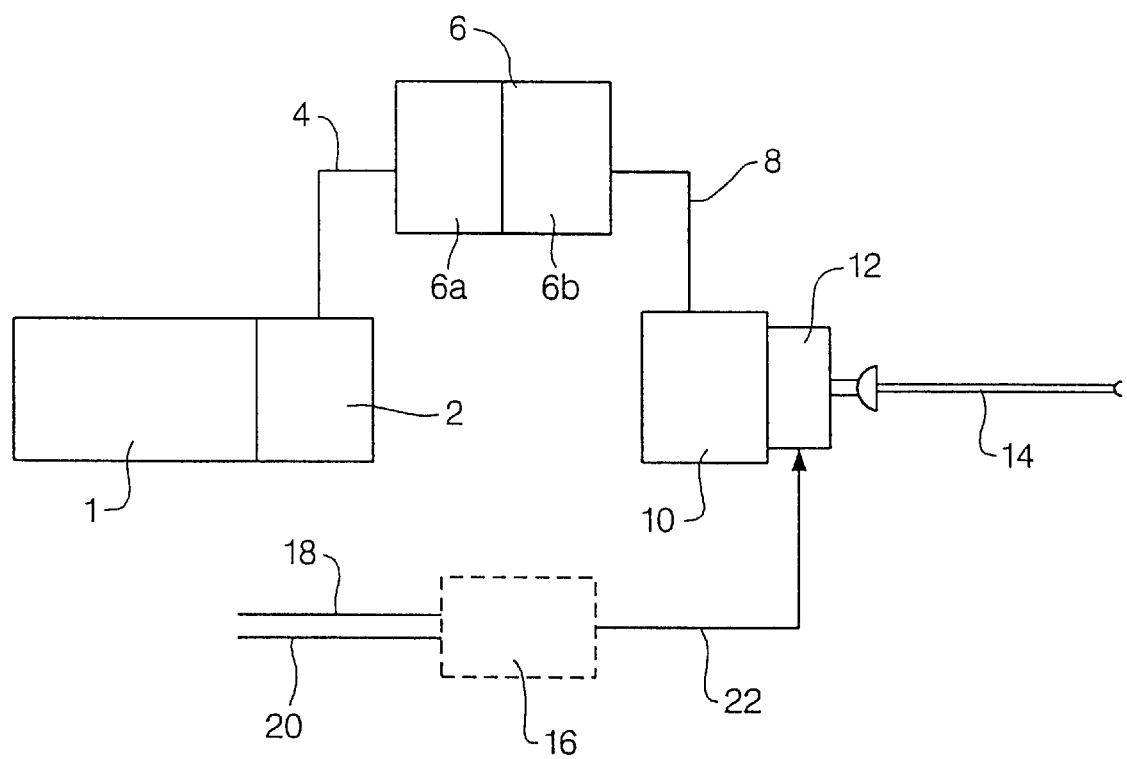
FIG. 1 shows a schematic design of a drive train in accordance with the invention.

FIG. 1 shows the drive train of the invention. The drive train comprises an internal combustion engine, 1 in the present instance a diesel motor. The internal combustion engine 1 is followed by a generator 2 which is connected to the driven shaft of the internal combustion engine 1 and generates the current necessary for the electric drive machine. A transversal flux machine (TFM) connected as a generator is preferably used as generator for the production of current. The generator is connected via lead 4 to frequency changer (e.g., a converter or inverter) subassembly 6 consisting of generator-inverter 6a as well as motor inverter 6b. Motor inverter 6b is connected for its part via lead 8 to traction motor 10, which is also preferably a transversal flux machine. Electric drive motor 10 is supplied via lead 8. An especially preferred embodiment provides the use of one and the same transversal flux machine, e.g., a transversal flux machine with an output between 150 kW and 210 kW at $M_{max}$ of approximately 1,000 Nm and an $n_{max}$ of 2,000 min$^{-1}$ for the generator and also for the drive motor. An especially compact drive arrangement results if, instead of a direct flanging of generator 2 on the drive motor, generator 2, inverter component 6 and traction motor 10 are combined in an especially preferred embodiment to a so-called electrical transmission unit. The electrical transmission unit can then be used instead of, e.g., an automatic transmission. In this manner the different drive concepts, namely, drive train with automatic transmission or diesel electric drive train can be replaced with one another very readily and without extensive refitting work.

The invention provides that a torque converter 12 is arranged between traction motor 10 and driven shaft 14 to the drive axles, which is designed in the present instance as a drive shaft (for example, possible of the universal-joint shaft or Cardan wave type). Torque converter 12 is preferably designed as a hydrodynamic torque converter as, e.g., in "Hydrodynamic Transmissions, Couplings and Brakes", Krausskopf-Verlag GmbH, Mainz, 1970 on pages 28–37. According to the invention, the torque converter is not in constant connection with the drive motor but rather can be coupled and decoupled via a coupling in the drive flow or flux from the traction motor to the drive shaft or bridged by a lock-up coupling. The lock-up coupling mentioned here can be a part of torque converter 12 and is not separately shown in the present figure. See regarding the lock-up and converter bridge coupling Gerigk, Bruhn, Danner, Endruschat, Gobert, Gross, Komoll, "Motor Vehicle Technology", Westermann Verlag, 2$^{nd}$ edition, 1994, pp. 349–352, the disclosed content of which is fully included in the application. It shows a hydrodynamic converter with bridge coupling on page 351, par. 3, like the one which can be used in the invention.

It is especially preferred if the lock-up coupling for coupling or decoupling the torque converter is coupled in or bridged as a function of certain input signals. The control device is shown in FIG. 1 in dotted lines and with reference numeral 16. Input signals are on control unit 16 on input leads 18, 20. For example, an input signal characterizing a start process is on lead 18. In order to determine whether a start process is present or not, appropriate means for its detection are provided in the vehicle. For example, it might be conceivable here that whenever the vehicle comes to a stop a signal is placed or created.

Current travel speed signals and/or acceleration signals of the vehicle are on lead 20. They are constantly compared with the given values in control unit 16. If the travel speed or delay reaches a given value, which can be stored in a memory area of control unit 16, an output signal is set and the coupling of torque converter 12 is caused to interrupt the power flow between the traction motor and torque converter 12 via output lead 22, that is, traction motor 10 acts directly on driven shaft 14 in this instance. Torque converter 12 has been taken out of the power flow therewith. In the case of a lock-up coupling this can take place by bridging the converter. If the start signal is on lead 18 the coupling of the torque converter is caused to couple to the torque converter 12 to traction motor 10 via output lead 22, that is, torque converter 12 is cut into the power flow from traction motor 10 to driven shaft 14 or the bridge is canceled.

FIG. 2 schematically shows the characteristic torque curve of a TFM traction motor like the one used in the drive arrangement of the invention with an output of 150 kW. It is the motor torque in Nm recorded over the motor speed in 1/min. As can be gathered from this, the transversal flux motor exhibits a constant course up to a speed of approximately 1,500 min$^{-1}$ and for speeds greater than 1,500 m$^{-1}$ the torque decreases continuously at higher speeds. This characteristic torque curve of the transversal flux motor is designated by reference numeral 100 and described, e.g., in "An Electrical Individual-Wheel Drive for City Busses of the Future", B. Wüst, R. Müller, A. Lange in Local Service, June/1994, pp. 1–7. For example, the moment curve designated in dotted lines and designated with reference numeral 102 is obtained by coupling the torque converter to the traction motor. Compared with the motor moment generated or delivered, the moment on the driven shaft is considerably raised. A rise by a factor of approximately 2 is shown in the present instance; of course, any values, to the extent that they can be technically realized, are possible for an expert in the art, depending on the problem posed.

Thus, the present invention suggests a solution for the first time which makes it possible that a diesel-electric drive is able to be designed with only a single traction motor and therefore with low weight in a street vehicle and also that a sufficiently high torque is made available in the starting range.

The particular advantage of this solution is the fact that for the first time it is possible to operate with one motor with a rather low torque and with one motor instead of two motors. This, for its part, advantageously means a lower vehicle weight, smaller dimensions, elimination of an inverter as well as a more favorable efficiency of the motor due to the elimination of external partial-load operating points or operating levels, e.g., during constant travel.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive arrangement for a vehicle with a driven shaft connected to the vehicle axles, said drive arrangement comprising:

at least one internal combustion engine;

at least one generator connected to said engine;

at least one transversal flux machine electric drive motor of the in electrical connection to said generator, said motor connected to at least one torque converter arranged between said drive motor and a driven shaft to the vehicle axles, said drive motor coupled to said converter for magnifying the torque delivered from said drive motor onto the vehicle axles via the driven shaft; and a coupling means for coupling said drive motor and said torque converter, said means can be coupled to said drive motor and decoupled from it or can bridge said torque converter.

2. The drive arrangement according to claim 1, in that said means for coupling and decoupling or bridging the torque converter to the drive motor is a lock-up coupling.

3. The drive arrangement according to claim 1, including a control mechanism which controls the torque converter in such a manner that the coupling is coupled to said drive motor during start procedures and is decoupled from said drive motor or bridged when at least one of a given travel speed or starting acceleration is exceeded.

4. The drive arrangement according to claim 1, in which said torque converter is a hydrodynamic torque converter.

5. The drive arrangement according to claim 1, in which said drive motor is arranged in the vehicle chassis.

6. The drive arrangement according to claim 1, in which said drive motor is provided in a central motor arrangement.

7. The drive arrangement according to claim 1, in which said generator and drive motor are combined into an electrical transmission unit.

* * * * *